(12) United States Patent
Mendoza Vera et al.

(10) Patent No.: US 10,427,613 B2
(45) Date of Patent: Oct. 1, 2019

(54) CUPHOLDER ASSEMBLIES

(71) Applicant: Ford Global Technologies, LLC, Dearborn, MI (US)

(72) Inventors: Omar Mendoza Vera, Tlalnepantla (MX); Claudio Alberto Clamont Bello, Torreon (MX); Uzziel Alcantara Barrera, Del. Benito Juarez (MX); Maria Fernanda Medina Luna, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 15/419,583

(22) Filed: Jan. 30, 2017

(65) Prior Publication Data

US 2018/0215320 A1   Aug. 2, 2018

(51) Int. Cl.
*B60R 7/08* (2006.01)
*B60R 7/04* (2006.01)
*B60N 3/10* (2006.01)

(52) U.S. Cl.
CPC ............... *B60R 7/08* (2013.01); *B60N 3/10* (2013.01); *B60N 3/101* (2013.01); *B60N 3/102* (2013.01); *B60R 7/04* (2013.01)

(58) Field of Classification Search
CPC .. B60R 7/08; B60R 7/04; B60N 3/101; B60N 3/10; B60N 3/102
USPC ........................................................ 296/24.34
See application file for complete search history.

(56) References Cited

U.S. PATENT DOCUMENTS

| | | | |
|---|---|---|---|
| 5,060,899 A * | 10/1991 | Lorence ................. | B60N 3/102 224/401 |
| 5,330,146 A * | 7/1994 | Spykerman ............ | B60N 3/102 224/281 |
| 9,004,433 B2 | 4/2015 | Krieger | |
| 9,333,920 B2 | 5/2016 | Skapof et al. | |
| 2016/0236604 A1 | 8/2016 | Parlow et al. | |
| 2016/0243969 A1 * | 8/2016 | Dunham ................ | B60N 3/107 |

* cited by examiner

*Primary Examiner* — Joseph D. Pape
*Assistant Examiner* — Dana D Ivey
(74) *Attorney, Agent, or Firm* — Vichit Chea; Brooks Kushman, P.C.

(57) ABSTRACT

A cupholder is provided. The cupholder preferably includes a fixed cupholder and a reversible cupholder pivotally attached with and nested within the fixe cupholder. The reversible cupholder may be configured to be pulled inside out such that a surface of the reversible cupholder in contact with the fixed cupholder when nested defines an interior cavity of the reversible cupholder when inside out, and positioned next to the fixed cupholder.

16 Claims, 3 Drawing Sheets

CUPHOLDER ASSEMBLIES

TECHNICAL FIELD

This disclosure relates to a cupholder for motor vehicles.

BACKGROUND

Motor vehicles typically include cupholders sufficiently configured to retain a beverage container for the convenience of the occupants of the vehicle. The cupholders are typically built into, or attached to one or more interior components of the vehicle such as a dash panel, door, or center console of the vehicle. In some locations, such as a center console positioned between two bucket seats, the cupholder may be limited to storing only a certain number of beverages and other articles.

SUMMARY

According to one embodiment of this disclosure a cupholder is provided. The cupholder preferably includes a fixed cupholder and a reversible cupholder pivotally attached with and nested within the fixed cupholder. The reversible cupholder may be configured to be pulled inside out such that a surface of the reversible cupholder in contact with the fixed cupholder when nested defines an interior cavity of the reversible cupholder when inside out, and positioned next to the fixed cupholder.

The reversible cupholder preferably includes four semi-rigid walls extending between a base and a top member. The four semi-rigid walls may further define a narrowed section disposed between the at least two recesses.

The reversible cupholder preferably includes a pull tab outwardly extending from the base to allow a user to pull the reversible cup inside out.

The reversible cupholder may be comprised of a material that has a modulus of elasticity that is at most half of a modulus of elasticity of the fixed cupholder.

The fixed cupholder preferably includes at least two protrusions outwardly extending from a top portion of the fixed cupholder. The protrusions preferably include at least two protrusions that define an aperture and are configured to receive a fastener for fixing the fixed cupholder to the console.

The fixed cupholder and the reversible cupholder may be connected by a living hinge.

According to another embodiment of this disclosure, a console including a fixed cupholder attached to the console and a reversible cupholder pivotally coupled to the fixed cupholder is provided. The reversible cupholder may include four semi-rigid walls defining an exterior surface and an interior surface and configured to move from a stowed position to a use position. When in the stowed position the reversible cupholder preferably nests within the fixed cupholder and the exterior surface is in contact with the fixed cupholder. When in the use position, the reversible cupholder is preferably positioned outside of the console and the interior surface is adjacent to the console.

The reversible cupholder and the fixed cupholder may be pivotally connected by a living hinge. The living hinge may include a first and a second elongated member connected by an intermediate portion. The intermediate portion preferably has a cross-sectional area less than a cross section defined by the first and second elongated members, wherein the first elongated member extends from the fixed cupholder and the second elongated member extends from the reversible cupholder and wherein the intermediate portion facilitates pivoting the reversible cupholder from the stowed position to the use position. The first elongated member preferably extends from the fixed cupholder and the second elongated member preferably extends from the reversible cupholder. The intermediate portion may facilitate pivoting the reversible cupholder from the stowed position to the use position.

According to yet another embodiment of this disclosure, a vehicle console including a fixed cupholder and a reversible cupholder pivotally coupled to the fixed cupholder is provided. The reversible cupholder may be nested within the fixed cupholder and may be configured to fold in on itself such that a surface of the reversible cupholder is in contact with the fixed cupholder when nested defines an interior cavity of the reversible cupholder and when inside out the reversible cupholder is positioned adjacent to the fixed cupholder.

The reversible cupholder preferably includes four semi-rigid walls extending between a base and a top member. The four semi-rigid walls may further define a narrowed section disposed between the at least two recesses.

The reversible cupholder preferably includes a pull tab outwardly extending from the base to allow a user to pull the reversible cup inside out.

The reversible cupholder may be comprised of a material that has a modulus of elasticity that is at most half of a modulus of elasticity of the fixed cupholder.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Motor vehicles typically include cupholders that provide storage areas for beverages. The cupholders are typically built into, or attached to one or more interior components of the vehicle. In some locations, such as a center console positioned between two bucket seats, the cupholder may be limited to storing only a certain number of beverages and other articles. Additional cupholders may be included in a vehicle console or elsewhere in the vehicle but additional cupholders may occupy more space within the vehicle cabin.

It is advantageous to provide an additional cupholder or cupholders that may be stored somewhere within the interior as to not take up additional space. One such cupholder may be stowed away within a compartment within a vehicle console, seatback panel or a trim panel in the cabin. Other cupholders may be a part of a tray table that can be pivoted outwardly from the vehicle seat or console.

Figure 1:
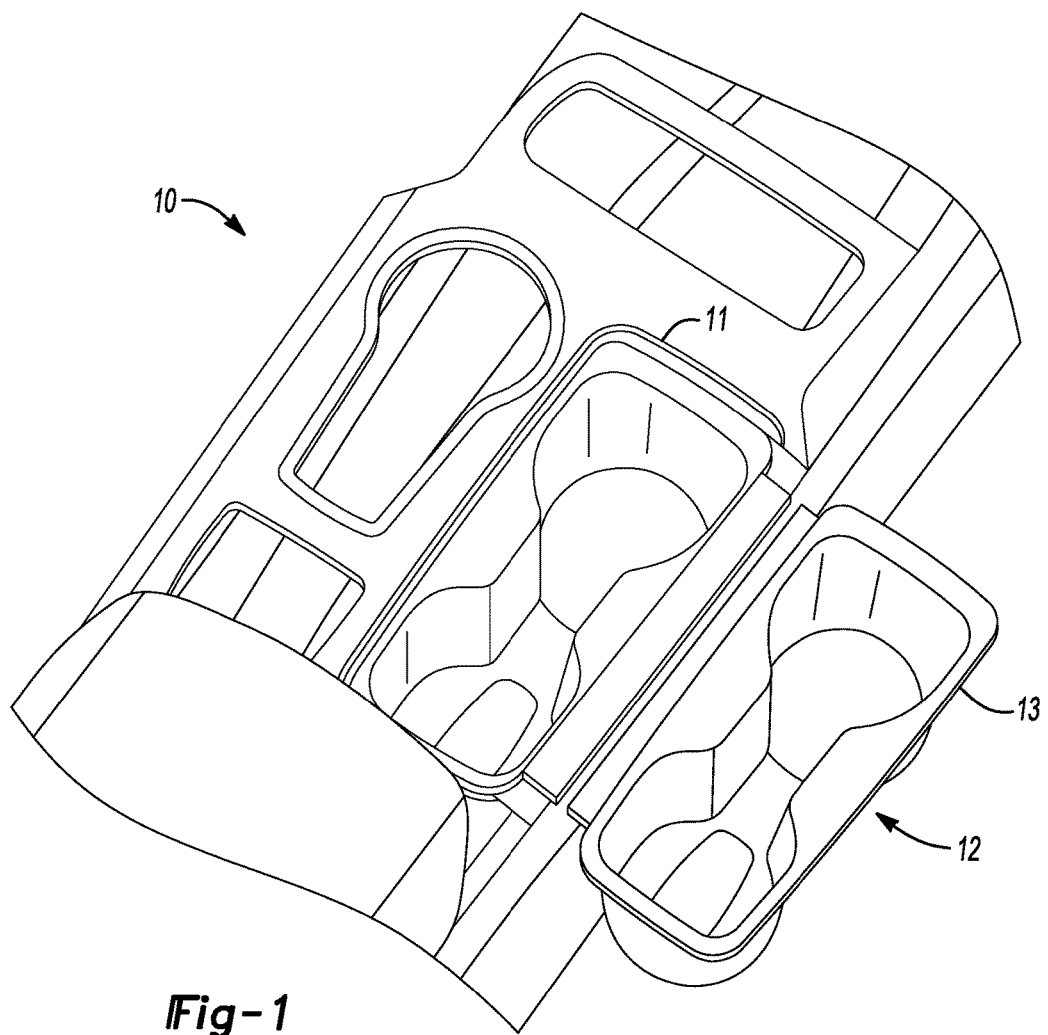
FIG. 1 is a perspective view of an example center console assembly according to one of the embodiments of this disclosure.
Figure 2:
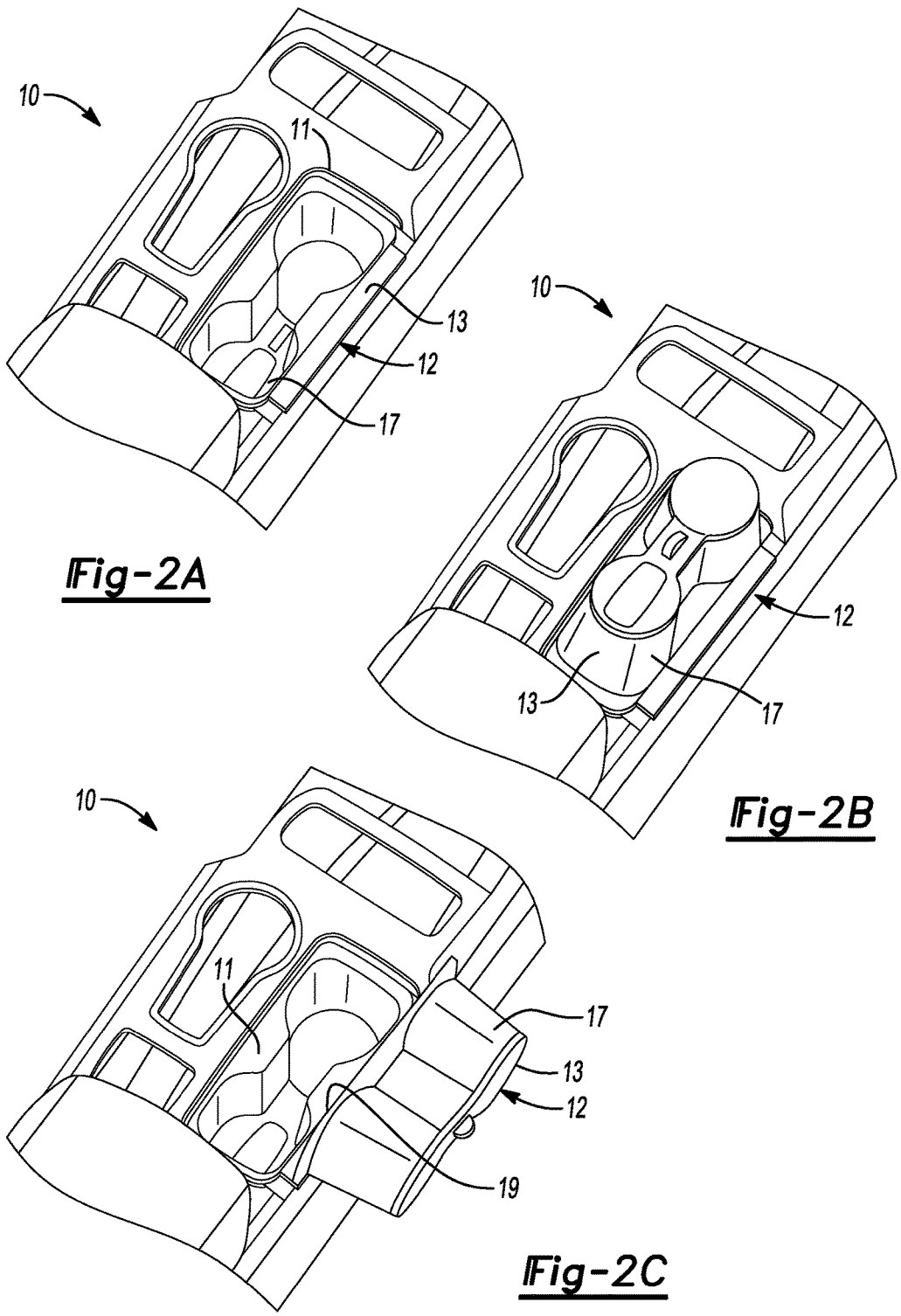
FIGS. 2A-2C are perspective views of the operation of the example center console according to one of the embodiments of this disclosure.

Referring to FIGS. 1 and 2, an example of a vehicle center console 10 is illustrated. The center console 10 is preferably positioned between two bucket seats of a vehicle (not shown). The center console 10 has a cupholder assembly 12 including a permanent or fixed plastic cupholder 11 and a pliable or reversible cupholder 13 attached to the fixed cupholder 11. The fixed cupholder shown preferably extends between the sides of the console. Alternatively, the reversible cupholder 13 may be connected directly to the center console 10. The fixed or permanent cupholder 11 is disposed within an aperture defined by the center console. The fixed cupholder 11 includes recessed portions 20a, 20b (FIG. 3) to hold or receive beverage containers or other articles.

Figure 3:
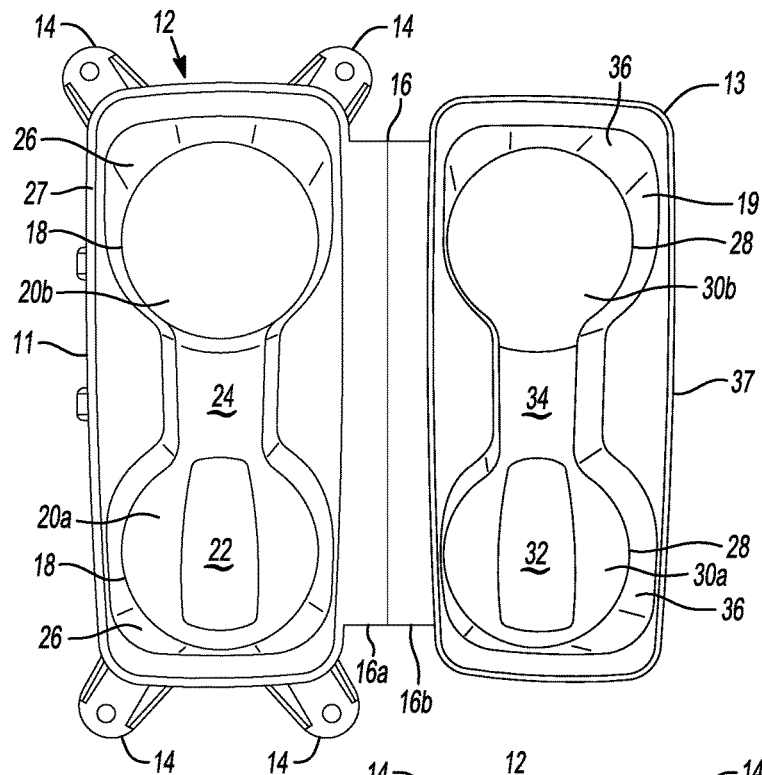
FIG. 3 is a top view of a cupholder assembly according to one of the embodiments of this disclosure.

Referring specifically to FIGS. 2A-2C, an illustration of the operation of the pliable or reversible cupholder assembly 12 is shown. FIG. 2-A shows the reversible cupholder 13 in the stowed position. In the stowed position the reversible cupholder 13 nests within the fixed cupholder 11. In this position the apparatus may hold up to two beverage containers or other suitable articles. The exterior surface 19 of the reversible cupholder 13 is positioned adjacent to the permanent cupholder 11 and the interior surface 17 is the surface that receives the beverage container or article. In FIG. 2-B, the reversible cupholder 12 outwardly extends above the fixed cupholder 11 as the reversible cupholder 13 is moved from the stowed position (FIG. 2-A) to the use position (FIG. 2-C). Between the stowed position (FIG. 2A) and the extended position shown in FIG. 2B, the reversible cupholder 13 folds in on itself from inside to out. In the extended position and use position, the interior surface 17 is external to the external surface and is positioned next to the outer portion of the center console. In both of these positions, the external surface 19 is the surface on which the beverage containers or other suitable articles would rest on. Referring to FIG. 2-C, the reversible cupholder 13 is shown pivoting from its extended position (2-B) to a use position (FIG. 3). The reversible cupholder 13 pivots about a living hinge 16 (FIGS. 3-4).

Figure 4:
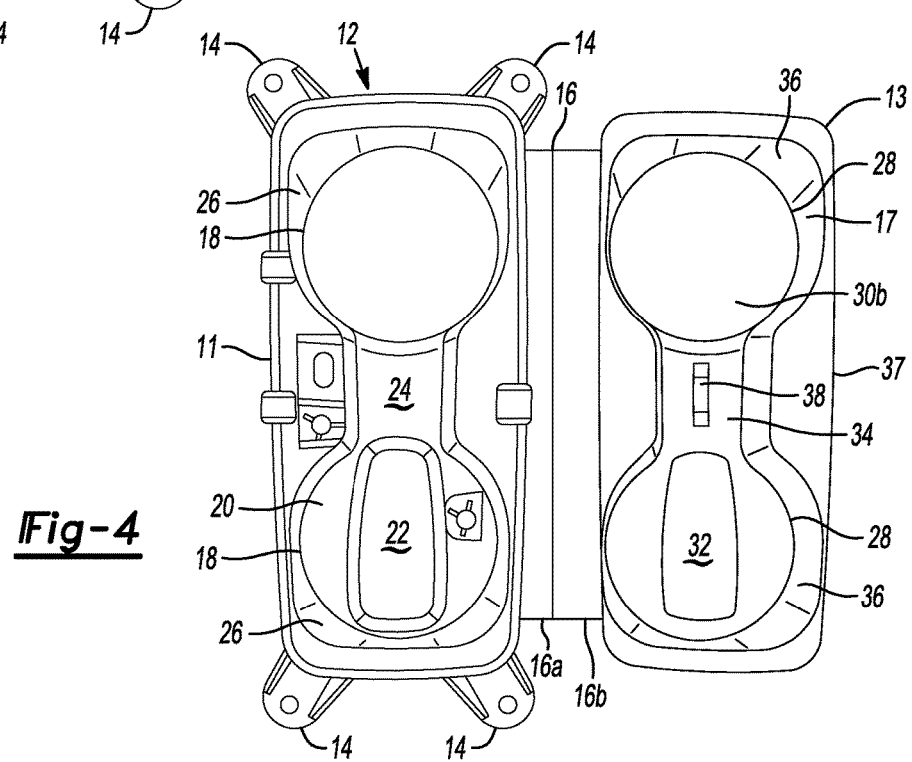
FIG. 4 is a bottom view of a cupholder assembly according one of the embodiments of this disclosure.

Referring to FIGS. 3 and 4, top and bottom views of the cupholder assembly 12 in the use position are illustrated. The fixed cupholder 11 is formed by four continuous walls 26 extending between a lip or top portion 27 and a base 18. The fixed cupholder preferably includes a first recess 20a and a second recess 20b, each configured to hold a beverage container. At least one indent 22 is formed within the base of at least one of the recesses, 20a and 20b. An intermediary space 24 is formed by the four walls 26. The intermediary space 24 and the indent 22 may be used to hold a mobile phone or other suitable device. Protrusions 14 extend from the lip 27 of the fixed cupholder 11. The protrusions may include holes or apertures for fastening the fixed cupholder 11 to the console 10.

A living hinge or integrated hinge 16 connects the fixed cupholder 11 with the reversible cupholder 13. The living hinge 16 includes an elongated top member 16a connected to the lip 27 of the fixed cupholder 11 to an elongated top member 16b of the reversible cupholder 13. A living hinge is a term that is well known in the art and may be a thin flexible hinge (flexure bearing) made from the same material as the two rigid pieces it connects, rather than cloth, leather, or some other flexible substance.

The living hinge preferably provides sufficient force to move allow the pliable or reversible cupholder 13 to pivot based on its own weight in response to being extended out of the fixed cupholder. The elongated top member of the fixed cupholder 16a and the elongated top member attached to the reversible or pliable cupholder 13 each have a cross sectional area sufficient to provide a durable connection. The living hinge preferably has a cross sectional area that is less than the cross sectional area defined by the each of the elongated top members 16a and 16b.

The reversible cupholder 13 has a nearly identical shape and size as the fixed cupholder and is configured to be nested within the fixed cupholder 11. The reversible cupholder 13 is formed by a semi-rigid wall 36 extending between a base 28 and a lip 37. The semi-rigid wall 36 is configured to pull the flexible cupholder 13 inside when the semi-rigid walls collapse on themselves. The material of the flexible cupholder 13 will be described in greater detail below. The reversible cupholder 13 preferably includes a first recess 30a and a second recess 30b, each configured to hold a beverage container. At least one indent 32 is formed within the base of at least one of the recesses, 30a and 30b.

An intermediary space 34 is formed by the four semi-rigid walls 36. The intermediary space 34 may allow a user to store other items besides beverage containers. Referring to specifically to FIG. 3, the exterior surface 19 of the reversible cupholder is shown in the extended position. A pull tab 36 (FIG. 4) extends from the exterior surface 19 of the reversible cupholder 13. The pull tab 38 allows a user or operator to conveniently grasp the exterior surface 19 of the reversible cupholder 13 to pull the reversible cupholder 13 from the stowed position to the extended or use position.

Referring specifically to FIGS. 3 and 4, a method of making the cupholder assembly 12 will be described. More specifically, the cupholder assembly 12 is formed by a two-shot molding operation. Either of the fixed cupholder 11 or the reversible cupholder 13 is formed by a first shot mold and the second shot molds the other of the fixed cupholder 11 or reversible cupholder 13. The fixed cupholder 11 may be constructed from a number of materials such as Acrylonitrile Butadlene and Styrene (ABS), Polypropelene (PP), Thermoplastic olefin (TPO), and a mixture of Polycarbonate (PC) and ABS. The reversible cupholder 13 is preferably made of a material that includes an elastomer and a thermoplastic material (e.g., thermoplastic elastomer (TPE), Ethylene-Propylene-Diene-Rubber (EPDM), or cross-linked styrene-ethylene butylene-styrene (SEBS)). The living hinge 16 including an elongated top member 16a connected to the lip 27 of the fixed cupholder 11 to an elongated top member 16b of the reversible cupholder 13 is preferably made from one of the materials listed above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cupholder assembly comprising:
   a fixed cupholder disposed within a console; and
   a reversible cupholder, provided with a pull tab, pivotally attached with and nested within the fixed cupholder, and configured to be
   pulled inside out by the pull tab such that a surface of the reversible cupholder in contact with the fixed cupholder when nested defines an interior cavity of the reversible cupholder when inside out, and positioned next to the fixed cupholder.

2. The cupholder assembly of claim 1, wherein the fixed cupholder defines four rigid walls and wherein the reversible cupholder includes four semi-rigid walls extending between an upper portion of the four rigid walls of the fixed cupholder and a bottom portion of the reversible cupholder.

3. The cupholder assembly of claim 2, wherein the pull tab outwardly extends from the base, and wherein the pull tab is configured to allow a user to pull the reversible cup inside out.

4. The cupholder assembly of claim 2, wherein the four semi-rigid walls define at least two recesses each sized to receive a beverage container.

5. The cupholder assembly of claim 4, wherein the four semi-rigid walls further define a narrowed section disposed between the at least two recesses.

6. The cupholder assembly of claim 1, wherein the reversible cupholder is comprised of a material that has a modulus of elasticity that is at most half of a modulus of elasticity of the fixed cupholder.

7. The cupholder assembly of claim 1, wherein the fixed cupholder includes at least two protrusions outwardly extending from a top portion of the fixed cupholder, wherein the at least two protrusions define an aperture configured to receive a fastener for fixing the fixed cupholder to the console.

8. The cupholder assembly of claim 1, wherein the fixed cupholder and the reversible cupholder are connected by a living hinge.

9. A console comprising:
a fixed cupholder attached to the console; and
a reversible cupholder pivotally coupled to the fixed cupholder, by a living hinge, including four semi-rigid walls defining an exterior surface and an interior surface, and configured to move from a stowed position to a use position,
wherein in the stowed position the reversible cupholder nests within the fixed cupholder and the exterior surface is in contact with the fixed cupholder, and
wherein in the use position the reversible cupholder is positioned outside of the console and the interior surface is adjacent to the console; and
a living hinge connecting the fixed cupholder and the reversible cupholder including first and second elongated members connected by an intermediate portion having a cross-sectional area less than a cross sectional area defined by the first and second elongated members, wherein the first elongated member extends from the fixed cupholder and the second elongated member extends from the reversible cupholder, and wherein the intermediate portion facilitates pivoting the reversible cupholder from the stowed position to the use position.

10. The console of claim 9, wherein the four semi-rigid walls define at least two recesses each sized to receive a beverage container.

11. The console of claim 10, wherein the fixed cupholder has an elastic modulus that is at least three times greater than an elastic modulus defined by the reversible cupholder.

12. The console of claim 9, wherein the fixed cupholder includes at least two protrusions outwardly extending from the top portion of the fixed cupholder, wherein the at least two protrusions define an aperture configured to receive a fastener for fixing the fixed cupholder to the console.

13. The console of claim 9, wherein the interior surface defines an elongated pull-tab, wherein the elongated pull-tab is configured for grasping the reversible cupholder when the reversible cupholder is in the stowed position.

14. A vehicle console comprising:
a fixed cupholder disposed within the console; and
a reversible cupholder pivotally coupled with and nested within the fixed cupholder by a living hinge, and configured to fold in on itself such that a surface of the reversible cupholder in contact with the fixed cupholder when nested defines an interior cavity of the reversible cupholder when inside out, positioned adjacent to the fixed cupholder wherein the living hinge is comprised of first and second elongated members connected by an intermediate portion having a cross-sectional area less than the first and second elongated members, wherein the first elongated member extends from the fixed cupholder and the second elongated member extends from the reversible cupholder, and wherein the intermediate portion facilitates pivoting the reversible cupholder from a stowed position to a use position.

15. The console of claim 14, wherein the reversible cupholder includes four semi-rigid walls extending from a planar base.

16. The console of claim 15, further comprising a pull tab outwardly extending from the planar base wherein the pull tab is configured to allow a user to pull the reversible cup inside out.

* * * * *